(12) United States Patent
Anvaripour et al.

(10) Patent No.: US 11,169,675 B1
(45) Date of Patent: Nov. 9, 2021

(54) CREATOR PROFILE USER INTERFACE

(71) Applicant: Snap Inc., Santa Monica, CA (US)

(72) Inventors: Kaveh Anvaripour, Santa Monica, CA (US); Gabriel Lupin, Marina del Rey, CA (US); Celia Nicole Mourkogiannis, Los Angeles, CA (US); Kirk Ouimet, Orem, UT (US); Swetha Krishna Prabhakar, Los Altos Hills, CA (US); Jeremy Voss, Los Angeles, CA (US); Haibo Zhao, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/457,590

(22) Filed: Jun. 28, 2019

(51) Int. Cl.
| | | |
|---|---|---|
| *G06F 3/0484* | (2013.01) | |
| *H04L 12/58* | (2006.01) | |
| *G06F 3/0482* | (2013.01) | |
| *G06F 3/0481* | (2013.01) | |
| *G06Q 50/00* | (2012.01) | |

(52) U.S. Cl.
CPC ........ *G06F 3/04845* (2013.01); *G06F 3/0482* (2013.01); *G06F 3/04817* (2013.01); *G06F 3/04847* (2013.01); *G06Q 50/01* (2013.01); *H04L 51/10* (2013.01); *H04L 51/32* (2013.01)

(58) Field of Classification Search
CPC ............. G06F 3/04845; G06F 3/04847; G06F 3/04817; G06F 3/0482; H04L 51/32; H04L 51/10; G06Q 50/01
See application file for complete search history.

(56) References Cited

U.S. PATENT DOCUMENTS

| | | | | |
|---|---|---|---|---|
| 10,489,041 | B1* | 11/2019 | Edwards | .................. G06F 8/38 |
| 2008/0208844 | A1* | 8/2008 | Jenkins | .................. G06Q 10/10 |
| 2009/0249177 | A1* | 10/2009 | Yamaji | ..................... G06T 11/60 |
| | | | | 715/204 |
| 2014/0041056 | A1* | 2/2014 | Stoop | .................. G06F 21/6263 |
| | | | | 726/28 |
| 2014/0068689 | A1* | 3/2014 | Sirpal | .............. H04N 21/42224 |
| | | | | 725/109 |

(Continued)

OTHER PUBLICATIONS

Facebook, "Spark AR Publishing Effects", Aug. 9, 2018, Facebook.com, All Pages (Year: 2018).*

(Continued)

*Primary Examiner* — Roberto Borja
(74) *Attorney, Agent, or Firm* — Schwegman Lundberg & Woessner, P.A.

(57) ABSTRACT

A system to generate a graphical user interface to display a presentation of lenses (e.g. overlays or transforms for images and video clips) as part of a creator profile within a messaging system are presented. In one embodiment, a device is configured to display a plurality of lens tiles within such a profile interface, with a lens summary interface for each lens that can be reached directly from the plurality of lens tiles. In such a system, each lens tile includes a content image modified by a corresponding lens, and the lens summary interface for each lens includes a set of lens detail information, such as views, shares, availability settings, and such. Lens data and various other information may be communicated efficiently within a messaging system while maintaining close connection with the creator of the lens data using various additional aspects of the interface.

20 Claims, 9 Drawing Sheets

(56) References Cited

U.S. PATENT DOCUMENTS

| | | | | |
|---|---|---|---|---|
| 2014/0195921 | A1* | 7/2014 | Grosz | G06Q 30/0601 |
| | | | | 715/738 |
| 2014/0203071 | A1* | 7/2014 | Eggert | G06F 16/23 |
| | | | | 235/375 |
| 2014/0365919 | A1* | 12/2014 | Shaw | H04M 1/72522 |
| | | | | 715/753 |
| 2016/0196584 | A1* | 7/2016 | Franklin | G06F 3/04845 |
| | | | | 705/14.64 |
| 2017/0244907 | A1* | 8/2017 | Lee | H04N 5/232 |
| 2017/0289234 | A1* | 10/2017 | Andreou | G06F 3/04845 |
| 2018/0164986 | A1* | 6/2018 | Al Majid | G06F 3/04845 |
| 2020/0066013 | A1* | 2/2020 | DeLuca | H04B 5/0025 |

OTHER PUBLICATIONS

TechBoomers, "How to View, Use, and Delete Your eBay Purchase History", Jul. 11, 2017, TechBoomers.com, All Pages (Year: 2017).*

* cited by examiner

700

```
┌─────────────────────────────────────────────┐
│ CREATING LENS DATA ASSOCIATED WITH A FIRST  │
│ ACCOUNT WITHIN AN MESSAGING SYSTEM          │
│ 702                                         │
└─────────────────────────────────────────────┘
                       │
                       ▼
┌─────────────────────────────────────────────┐
│ STORING THE LENS DATA FOR A PLURALITY OF    │
│ LENSES ASSOCIATED WITH THE FIRST ACCOUNT AS │
│ PART OF AN APPLICATION FOR THE MESSAGING    │
│ SYSTEM                                      │
│ 704                                         │
└─────────────────────────────────────────────┘
                       │
                       ▼
┌─────────────────────────────────────────────┐
│ DISPLAYING, ON A DISPLAY SCREEN OF THE      │
│ COMPUTING DEVICE A LENS CREATOR PROFILE     │
│ INTERFACE COMPRISING A PLURALITY OF LENS    │
│ TILES, AND ADDITIONALLY BEING CONFIGURED TO │
│ DISPLAY ON THE SCREEN A LENS SUMMARY        │
│ INTERFACE FOR EACH LENS OF THE PLURALITY OF │
│ LENS TILES THAT CAN BE REACHED DIRECTLY     │
│ FROM THE PLURALITY OF LENS TILES WITH THE   │
│ LENS TILES COMPRISING A CONTENT IMAGE       │
│ MODIFIED BY A CORRESPONDING LENS AND LENS   │
│ DETAIL INFORMATION WITHIN THE LENS SUMMARY  │
│ INTERFACE                                   │
│ 706                                         │
└─────────────────────────────────────────────┘
                       │
                       ▼
┌─────────────────────────────────────────────┐
│ COMMUNICATING LENS DATA BETWEEN ACCOUNTS    │
│ USING THE LENS CREATOR PROFILE INTERFACE    │
│ 708                                         │
└─────────────────────────────────────────────┘
```

*FIG. 7*

CREATOR PROFILE USER INTERFACE

TECHNICAL FIELD

Embodiments of the present disclosure relate generally to graphical user interfaces (GUI) and, more particularly, to systems for generating and causing display of GUIs.

BACKGROUND

A user profile is a visual display of personal data associated with a specific user, or a customized desktop environment. A profile refers therefore to the explicit digital representation of a person or entity's identity. A profile can be used to store the description of the characteristics of a person, group, or entity. This information can be used by systems taking into account the persons' characteristics and preferences.

Although some people choose to use their real names online, some social media users prefer to be anonymous, identifying themselves by means of pseudonyms, which reveal varying amounts of personally identifiable information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is a flowchart illustrating a method for managing a collaborative user profile, according to certain example embodiments.

DETAILED DESCRIPTION

Figure 1:
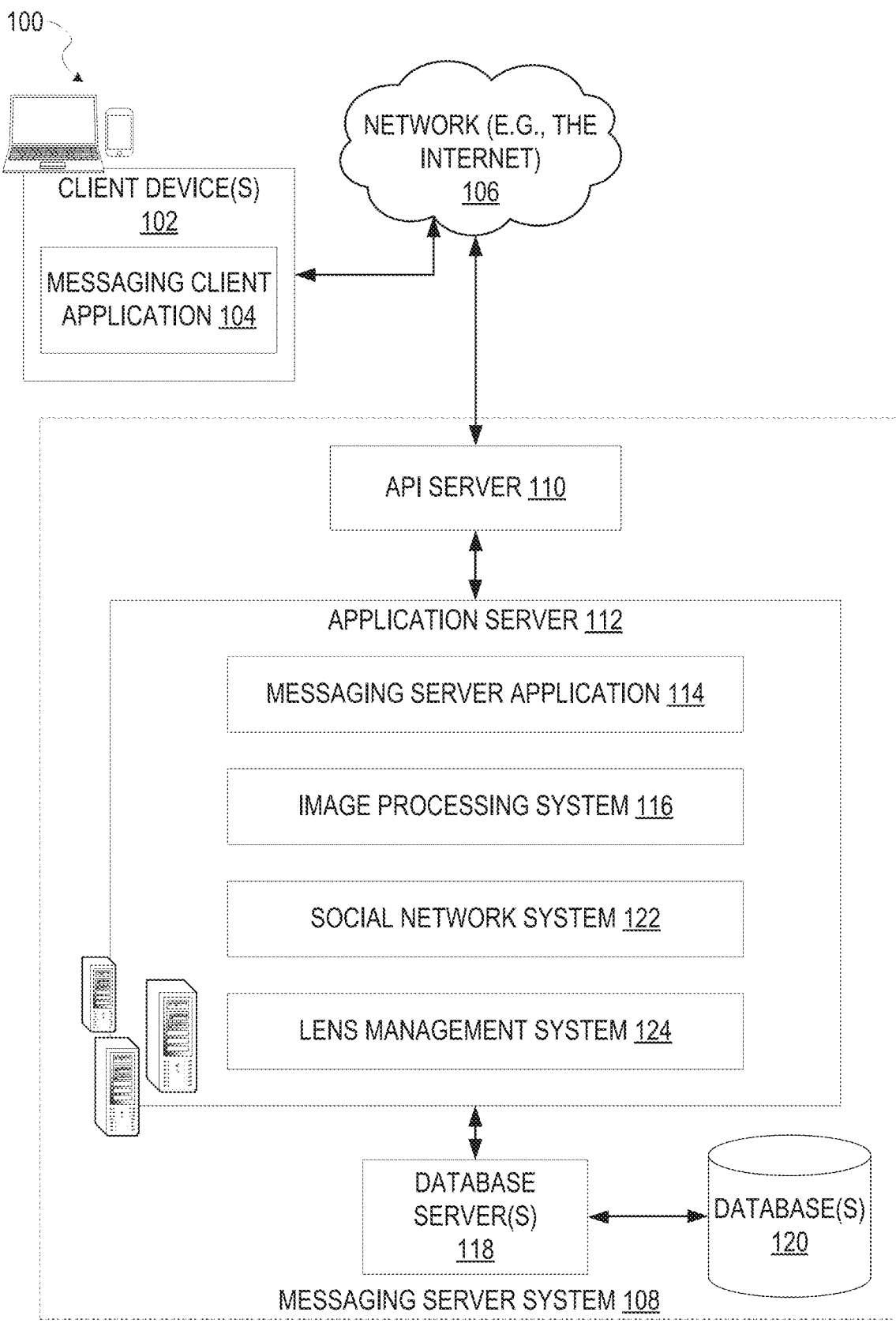
FIG. 1 is a block diagram showing an example messaging system for exchanging data (e.g., messages and associated content) over a network, in accordance with some embodiments.

Systems, methods, user interfaces, instructions stored in media, computing devices, and other various embodiments associated with lens creator profile user interfaces are described. These include interfaces for the account that creates and manages the lenses, as well as other accounts which access and use such lenses.

In a social messaging system, content (e.g. images and video clips) may be communicated as part of the messaging. One way of customizing such content is the use of a lens which modifies or transforms the content in some way. For example, complex additions or transformations to the content images may be performed using lens data, such as adding rabbit ears to the head of a person in a video clip, adding floating hearts with background coloring to a video clip, altering the proportions of a person's features within a video clip, or many numerous other such transformations. In order to both provide unique user experiences, to provide attribution to lens creators, and to enable creators to protect various aspects of data within the messaging system, the system may provide tools both for users to generate and share such lenses, as well as limiting access to such filters in various ways.

Embodiments herein particularly describe user interfaces to improve management and communication of such lens data within a social messaging system. In one embodiment, a creator profile interface is provided which includes tiles for lenses created by a user in association with a user account, along with other profile information such as lists of associated accounts (e.g. friends), lists of content collections (e.g. various groupings of images and/or video clips), or other such profile information. The lens tiles within the profile surface key lens information, such as a previous (e.g. example) of a lens applied to selected content, along with a lens icon for use in various other user interfaces to represent the lens, a lens name, and a number of lens views within the messaging system. Lens detail information available by selecting a lens tile may include additional information and settings associated with a lens, such as total system shares for the lens, total system scans for the lens, subscriber account information associated with the lens or the lens creator, availability settings for the lens data (e.g. public and promotable, public but restricted from system promotions, semi-private or friend only, private and not sharable, or other such settings). Lens tiles may be sorted according to usage data (e.g. total shares), names, a custom creator sorting, or any other such ordering. In some systems, the placement of the grouped lens tiles within the creator profile interface may be automatically adjusted by the system based on various settings, such as the number of shares for one or more lenses. This may place the lens tiles in a more prominent position of a creator's profile interface as the lenses are used more often within the system, or as a user creates more lenses.

Elements within the creator interface, the lens tiles, or lens detail information may provide elements to improve the ease of communicating lenses between accounts of the messaging system. This may include, for example, interface areas for sending lens data from a creator account to a second user account and authorizing that user to apply the lens to messages sent by the second user account. By structuring such interface areas directly within an organized profile interface, the lens data may be communicated more directly between system users with fewer interface actions, thus improving the operation of system devices.

Further aspects of creator profiles may enable additional lens controls and structures, such as options to sell authorization to use some or all of a creator's lenses to other accounts. Some systems may additionally generate content collections associated with lenses. For example, a content collection may be created which includes every public piece of content that a particular lens was used with within a set time period (e.g. 24 hours, one week, etc.), or every piece of content that an account associated with the collection is authorized to view. Other such systems may show a threshold number of pieces of content that have used the filter and have privacy settings that authorize viewing. In some embodiments, a creator authorizes other accounts to use the lens on the basis that the creator account is authorized to use content that the lens is applied to in a content collection viewable within the creator profile interface. In other embodiments, such privacy settings are structured to allow any user to maintain content as private and/or ephemeral with settings independent of any lens creator selections.

In various embodiments, creator profile interfaces may be accessed either from within an account associated with the creator, from an account having a friend association with the creator account, or from a general account not associated with the creator account. Various control and privacy elements may be adjusted depending on the relationship of a creator account with the account viewing the creator profile interface. Similarly, the specific lens tiles and lens data available (e.g. viewable, downloadable, purchasable, etc.) and the communication options within the interface may be adjusted based on such account associations.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically more resource efficient to initially deploy certain technology and functionality within the messaging server system 108, but to later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the application program interface (API) server 110, this server receives and transmits message data (e.g., commands and message payloads) between the client device 102 and the application server 112. Specifically, the application program interface (API) server 110 provides a set of interfaces (e.g., routines and protocols) that can be called or queried by the messaging client application 104 in order to invoke functionality of the application server 112. The application program interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a lens management system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware resources for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

The database 120 also stores lens data. As described herein, a lens refers to a specific modification to an image or video clip. While the term "lens" is used in this specification, various embodiments may use any content annotation, overlay, media filter, or any other such transforms in different embodiments. Lenses (e.g. filters, overlays, transforms, etc.) for which data is stored within an annotation table are associated with and applied to videos (for which data is stored in a video table) and/or images (for which data is stored in an image table). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table is additional lens or transform data, which may be a real-time special effect. Additionally, any such information may include sound that may be added to an image or a video.

Figure 2:
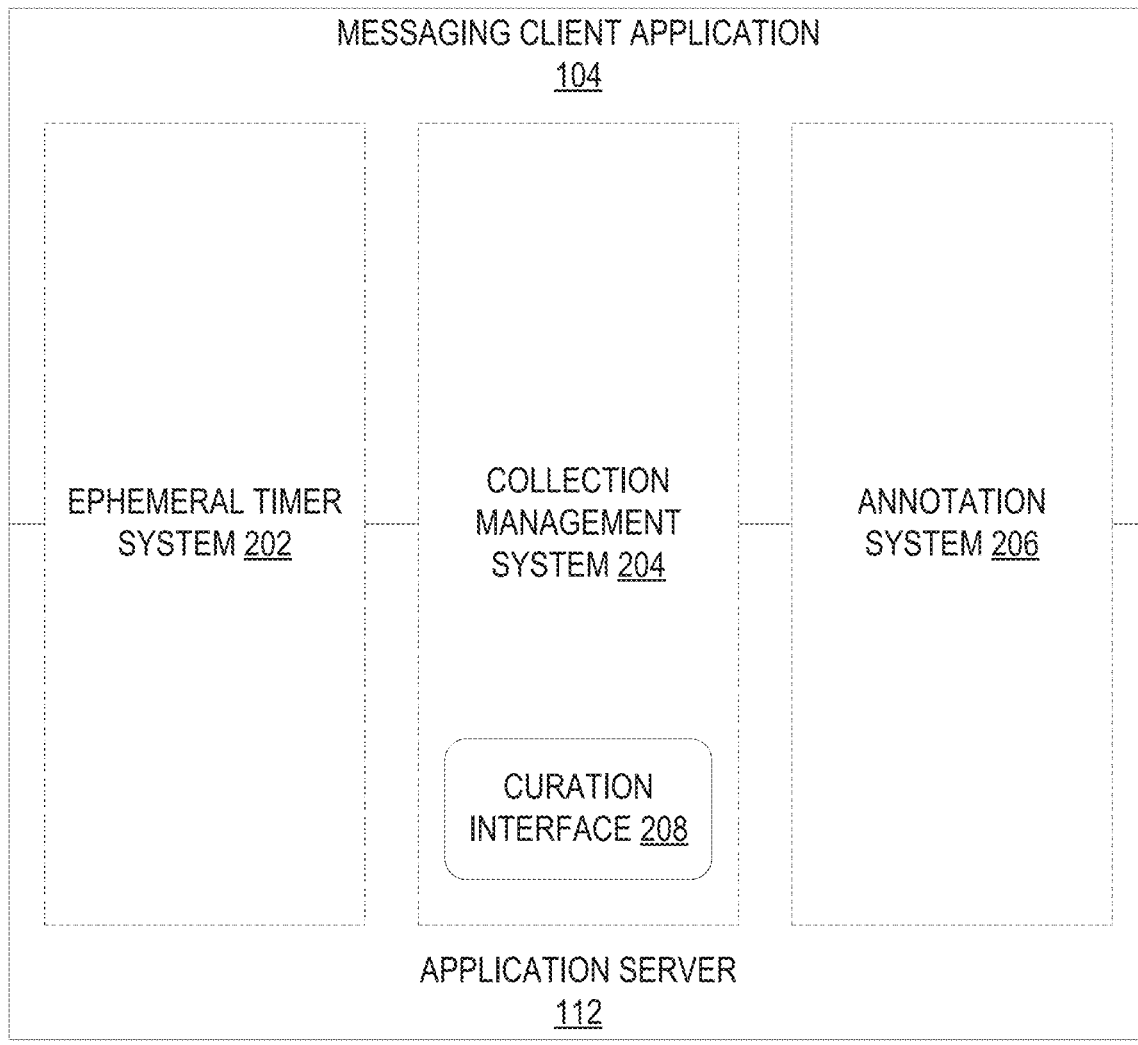
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

In some embodiments, collection management system 204 may identify all messages within a system that include a particular lens (e.g. content from different accounts with a public or at least semi-public setting where a lens has been applied to the content), and can aggregate the content into a content collection associated with the lens. This content collection may then be made available for viewing by an account associated with the creator of the lens, or with various other sets of accounts depending on the particular system and the privacy settings of the content included in the collection.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay includes text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Such user-based publication platforms may also enable particular system tools to user accounts for creation and/or management of lenses created by a user and made available within the system for the creator or other accounts selected by the creator's account. Lenses and other such media overlay information may be managed via annotation system 206 and then integrated into a creator profile interface as described below. For example, lenses created within the system or uploaded to the system via annotation system 206 may have lens tiles generated for use within a profile interface, which may then be used to further enable communication of the lens data within the messaging system 100 associated with application server 112.

In another example embodiment, the annotation system 206 provides a publication platform that enables lens creators to select various limitations for access to lens data, such as limitations based on a payment sent to the creator account, limitations based on a geographic area, limitations based on user account associations or group membership, or any other such limitations on the use of lens data within the messaging system 100 of application server 112.

Figure 3:
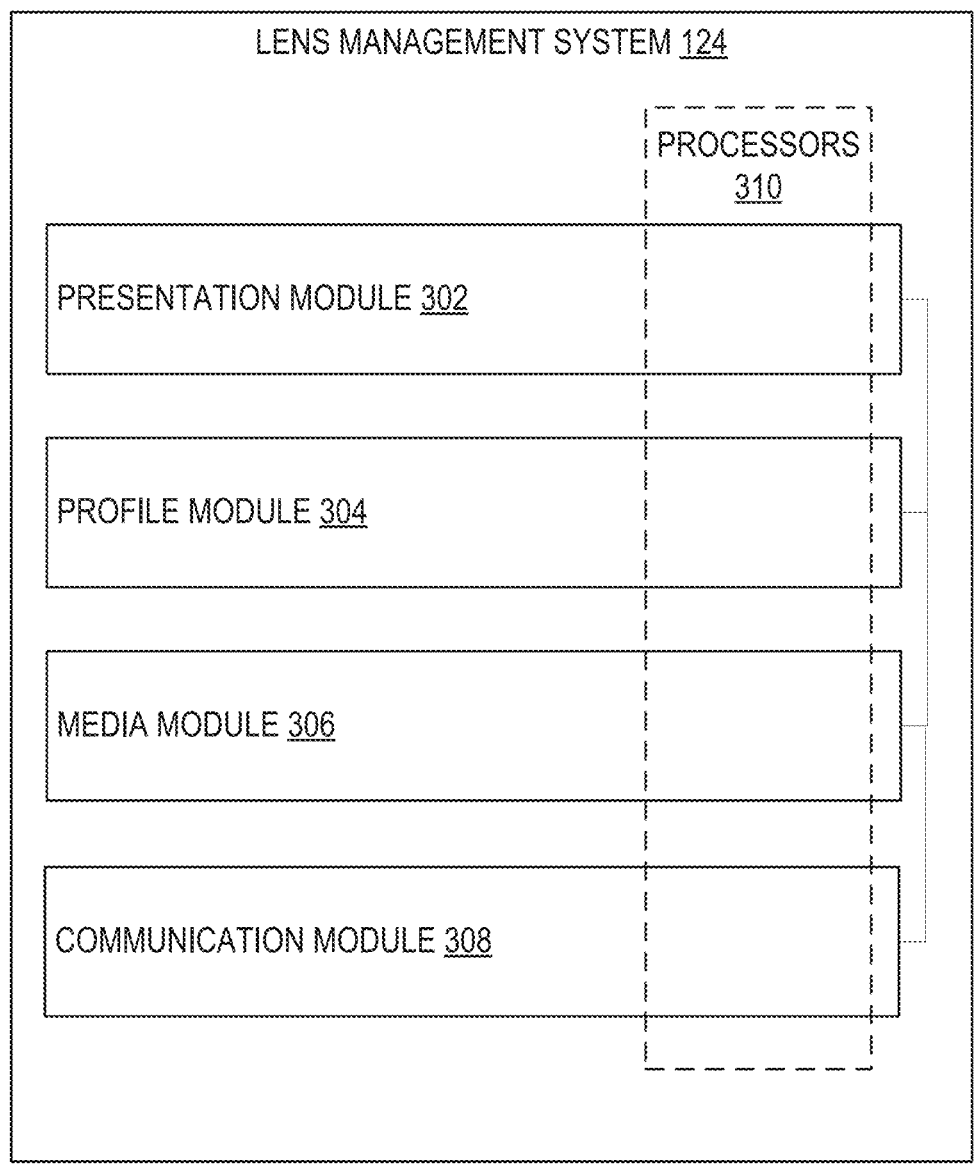
FIG. 3 is a block diagram illustrating various modules of a lens management system, according to certain example embodiments.

FIG. 3 is a block diagram illustrating components of the messaging system 100 which enable the system to perform operations that include communicating content modified by lens data between accounts. The lens management system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors 310 to perform functions described for that module) and hence may include one or more of the processors 310. While these modules are described in the context of lens management, such elements may be integrated with larger profile and data management systems within various embodiments.

Any one or more of the modules described may be implemented using hardware alone (e.g., one or more of the processors 310 of a machine) or a combination of hardware and software. For example, any module described of the lens management system 124 may physically include an arrangement of one or more of the processors 310 (e.g., a subset of or among the one or more processors of the machine) configured to perform the operations described herein for that module. As another example, any module of the lens management system 124 may include software, hardware, or both, that configure an arrangement of one or more processors 310 (e.g., among the one or more processors of the machine) to perform the operations described herein for that module. Accordingly, different modules of the lens management system 124 may include and configure different arrangements of such processors 310 or a single arrangement of such processors 310 at different points in time. Moreover, any two or more modules of the lens management system 124 may be combined into a single module, and the functions described herein for a single module may be subdivided among multiple modules. Furthermore, according to various example embodiments, modules described herein as being implemented within a single machine, database 120, or device may be distributed across multiple machines, databases 120, or devices.

As described above, lenses in accordance with embodiments described herein refer to modifications that may be made to videos or images. This includes both real-time modification which modifies an image as it is captured using a device sensor and then displayed on a screen of the device with the lens modifications. This also includes modifications to stored content, such as video clips in a gallery that may be modified using lenses. For example, in a creator profile with multiple lenses, an authorized third party account may use a single video clip with multiple lenses to see how the different lenses will modify the stored clip. Similarly, real-time video capture may be used with a lens to show how video images currently being captured by sensors of a device would modify the captured data. Such data may simply be displayed on the screen and not stored in memory, or the content captured by the device sensors may be recorded and stored in memory with or without the lens modifications (or both).

Lens data and various systems to use lenses and modify content using lenses may thus involve detection of objects (e.g. faces, hands, bodies, cats, dogs, surfaces, objects, etc), tracking of such objects as they leave, enter, and move around the field of view in video frames, and the modification or transformation of such objects as they are tracked. I various embodiments, different methods for achieving such transformations may be used. For example, some embodiments may involve generating a three dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using lenses, such as a human's face and parts of a human body, animals, or non-living things such as chairs, cars, or other objects.

In some embodiments, when a lens is selected along with content to be transformed, elements to be transformed by the lenseare identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used.

In some embodiments of lenses using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, lenses may be used by a system where a user may capture an image or video stream of the user (e.g., a selfie) using a client device 102 having a neural network operating as part of a messaging application 104 operating on the client device 102. The transform system operating within the messaging application 104 determines the presence of a face within the image or video stream and provides modification icons associated with the lenses, or the lenses may be present as associated with an interface described herein. The modification icons include changes which may be the basis for modifying the user's face within the image or video stream as part of the lens operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and lens selection (e.g. initiation from a content creator user interface) In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

The interfaces described herein may provide information on a wide variety of lenses which may be generated and used within a system. The various modules within a lens management system 124 or other management systems of a messaging system 100 such as the system using messaging server system 108 may operate in a variety of ways to improve device performance by managing system communications and interfaces as described herein. In some systems, the use of lenses is both outside of the standard structure for a messaging system 100, and a driver of system use, and so systems that improve performance by reducing interface operations, particularly for creator accounts, while also providing increased creator control and options for creator attribution improve the overall system performance. The various modules and systems described above and below thus enable creator accounts improved interface options for communicating lens data within a system, and improve lens management and access options. Embodiments herein improve such options within lens interfaces not only for creators, but improve interfaces for associated or general accounts which view profile information and associated lenses via interfaces available to other accounts. To access lenses, users can visit creator accounts via creator profile interfaces available to other accounts, and use those interfaces to unlock lenses directly (e.g. via request, purchase, or other mechanisms approved by the lens creating/managing account.) For lens creators, lenses available within a system created in association with the creator account appear within the creator profile as detailed below, implemented using the modules described above.

Figure 4:
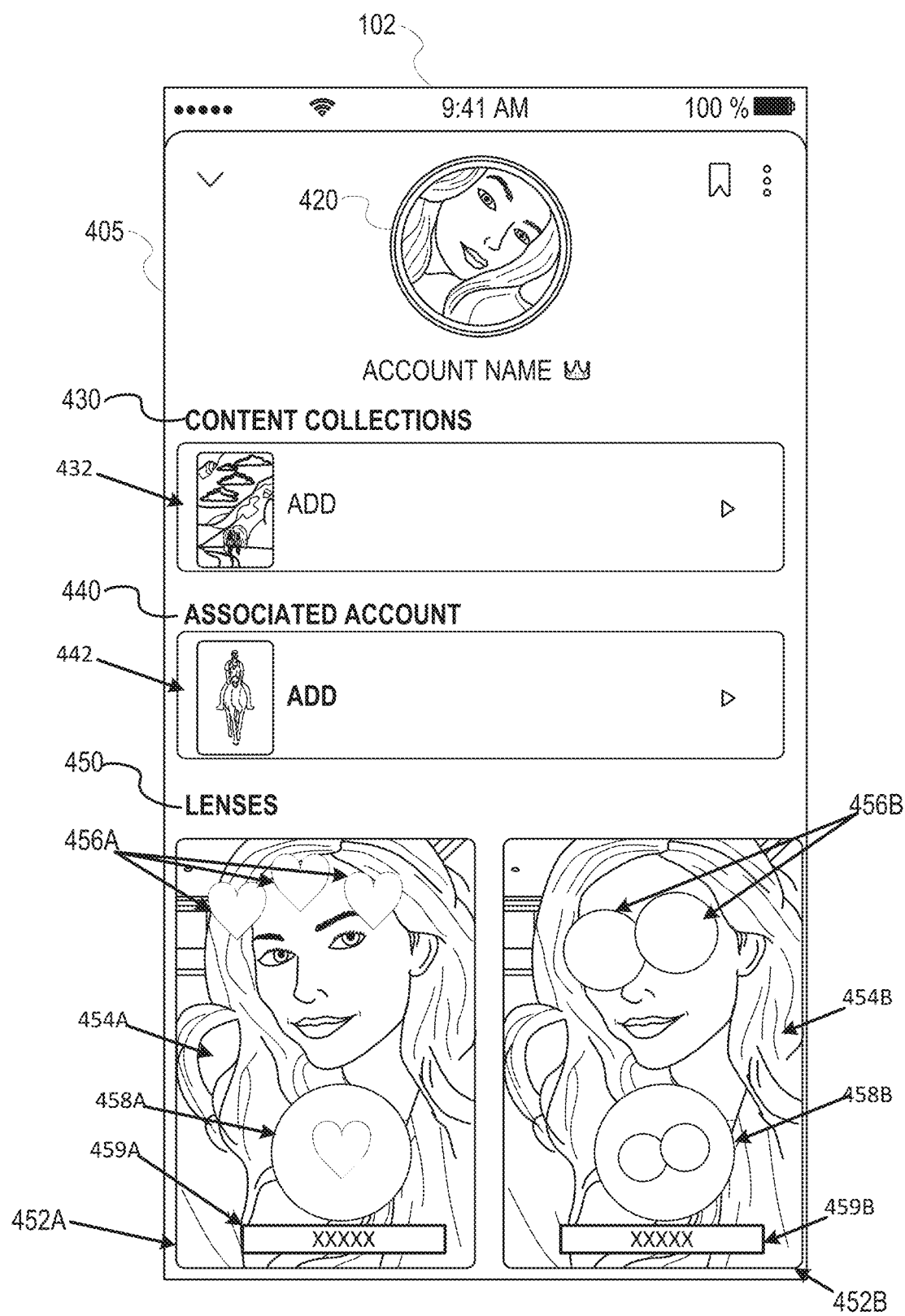
FIG. 4 is an interface diagram depicting aspects of a user interface, according to certain example embodiments.

FIG. 4 is an interface diagram depicting aspects of a user interface 405, according to certain example embodiments. User interface 405 is displayed on a screen of a device 102. User interface 405 illustrates a lens creator profile interface with a plurality of lens tiles 452. In addition to providing information about corresponding lenses, lens tiles 452 each provide a direct link to a lens summary interface, such as the lens summary interface 500 illustrated in FIG. 5, for the corresponding lens of each lens tile 452.

Illustrated lens tiles 452A and 452B each include content 454 altered by example lens modification 456 for a corresponding lens. The lens modification 456A for the corresponding lens of lens tile 452A, for example, adds floating hearts to content 454A. Lens modification 456B adjusts features around the eyes of a person in content 454B, and can be presumed to track eyes in video clips, and maintain the lens modification 456B around the eyes of any people present in content that the lens is applied to. While two lens tiles 452 are shown, a creator profile interface may include any number of lens tiles 452 in various embodiments, with the ability to scroll among the tiles and other aspects of the interface 405 if all of the elements of the interface 405 do not fit within a single screen. Lens tiles 452 also include a lens icon 458 and a lens name 459. In some embodiments, a number of views for each lens (e.g. a number of times the system has determined that a piece of content modified by the corresponding lens has been viewed within the messaging system 100) may be present in a lens tile 452 as well.

Lens tiles 452 are present within a lens interface area 450 having a title area with the illustrated lenses below within lens interface area 450. In addition to the lens tiles 452 in lens interface area 450, the user interface 405 also includes a user identification area 420, content collection interface area 430 and associated account interface area 440. Content collection area 430 may include one or more content collection tiles 432 which allow access to collections of content which may be grouped according to subject matter, location, source account, or any other grouping. For example, one content collection may include pieces of content (e.g. images or video clips) from different user accounts where the content is created within a certain geofence, while another content collection may be content from a single user account. In some embodiments, the messaging system 100 automatically generates content collections made up of the most recent public pieces of content within the messaging system 100 that use filters from a certain content creator, or public pieces of content using a single filter. In one embodiment, a user account associated with user interface 405 may automatically have two content collections generated and presented for lenses created by the owner of the account (e.g. one content collection for the lens associated with lens tile 452A and another for the lens associated with lens tile 452B). Such content collections may only be generated, in some embodiments, if a threshold number of public pieces of content are present in the system at a given time, and the content collection may be removed when the number of available pieces of content using a lens (e.g. due to ephemeral timers triggering removal of pieces of content from the system) fall below the threshold. (e.g. 10 pieces of content, 15 pieces of content, etc.) Content collections identified with the content collection area 430 may be displayed in order of recency, such that the most recent piece of content added to each collection determines a recency of the collection and the order of the collections within the area. Each collection may also have an interface element allowing the collection to be hidden, either temporarily (e.g. until the next update to the collection) or until an unhide selection is made.

User interface 405 also includes a "friend" area or associated account area 440. This area may include a listing of accounts having a social graph connection or a direct connection with the account associated with user interface 405. This friend area may enable messaging with other accounts and, in some embodiments, may enable the user account for interface 405 to control the access of these associated accounts to lenses created by and/or managed by the account for interface 405. For example, in some embodiments, individual user accounts are authorized by a controlling or managing account before those other individual user accounts are allowed by the system to apply a lens to content within the system. This may, for example, be a setting selected by the account associated with interface 405. In such a system, selection of a tile 442 within associated account area 440 may include a selection option via a menu to authorize the associated account to use a particular lens, and may enable a command to send lens data to enable another device 102 associated with the associated account to apply the lens.

In addition to these illustrated areas 420, 430, 440, and 450, various embodiments of a user interface 405, in accordance with the present embodiments, may also include other areas, such as an area for custom pictograms, elected emojis, or other such image or account selected information. In some embodiments, only a limited number of lens tiles 452 may be presented (e.g. three lens tiles, five lens tiles, etc.) Such lens tiles may be selected based on popularity or use metrics within the system, with lenses having greater numbers of shares (e.g. combinations of message sends using the lens and posts in a system using the lens, or other such metrics). In other embodiments, all lenses made by a user may have their lens tiles 452 displayed and accessible via scrolling within the creator interface. In some embodiments, an initial number of lens tiles 542 are shown, and if the account manages or has created more lenses, these lenses may be accessible via an interface selection to expand the lens area 450 and display more lens tiles 542 within the creator profile interface. In other embodiments, if more than a threshold number of lenses are associated with an account as the creator or manager of the lenses, a separate view of all lenses interface may be linked to the creator profile interface to allow viewing of all lenses associated with the account via a dedicated lens interface with a scrolling mechanism.

In some embodiments, the messaging system 100 may automatically adjust the placement of these areas based on data associated with certain lenses. For example, one embodiment may have a threshold number of lens views (e.g. 100 views, 1000 views, etc.) which is used to prioritize the placement of the lens area 450 within the user interface 405. In such a system, the lens area 450 may be moved closer to area 420 based on the threshold being met, and other areas may be moved below lens area 450. In other embodiments, each area within user interface 430 may have a priority score based on usage history or other account history information, and the placement of the area within the user interface 405 may be adjusted based on a weighted score that changes over time. In other embodiments, a combination of fixed and adjustable areas may be used. For example, the placement of areas 420 and 430 may be fixed, but areas 440, 450, and additional areas may be adjusted based on various thresholds and comparative usage or scoring values maintained by the messaging system 100.

For third party general accounts that access lens tile information via an interface, selection of a lens tile 452 may link to a lens unlock interface and/or a camera interface, to enable a user to preview and then use the lens immediately from the interface showing the lens tile 452. This enables other users to have improved device operations to apply lens transformations quickly to images captured by a camera via direct links to the camera from the lens tile 452 in association with any unlock operations (e.g. purchase or approval verification operations).

Interface 405 illustrates lens area 450 as presented in an order within the interface 405 along with other areas 430, 440, etc. In some embodiments, depending on the amount of detail present within an interface, rather than these areas being presented simultaneously with a scroll option, a header with selectable area tabs may be present. For example, one such embodiment may show a content collection tab, a friend tab, and a lens tab, with selection of a tab presenting the associated area on the screen and hiding the other areas. Selection of a lens tab would display lens area 450 within the screen along with the associated lens tiles 452, and selection of another tab would hide the lens area 450.

Figure 5:
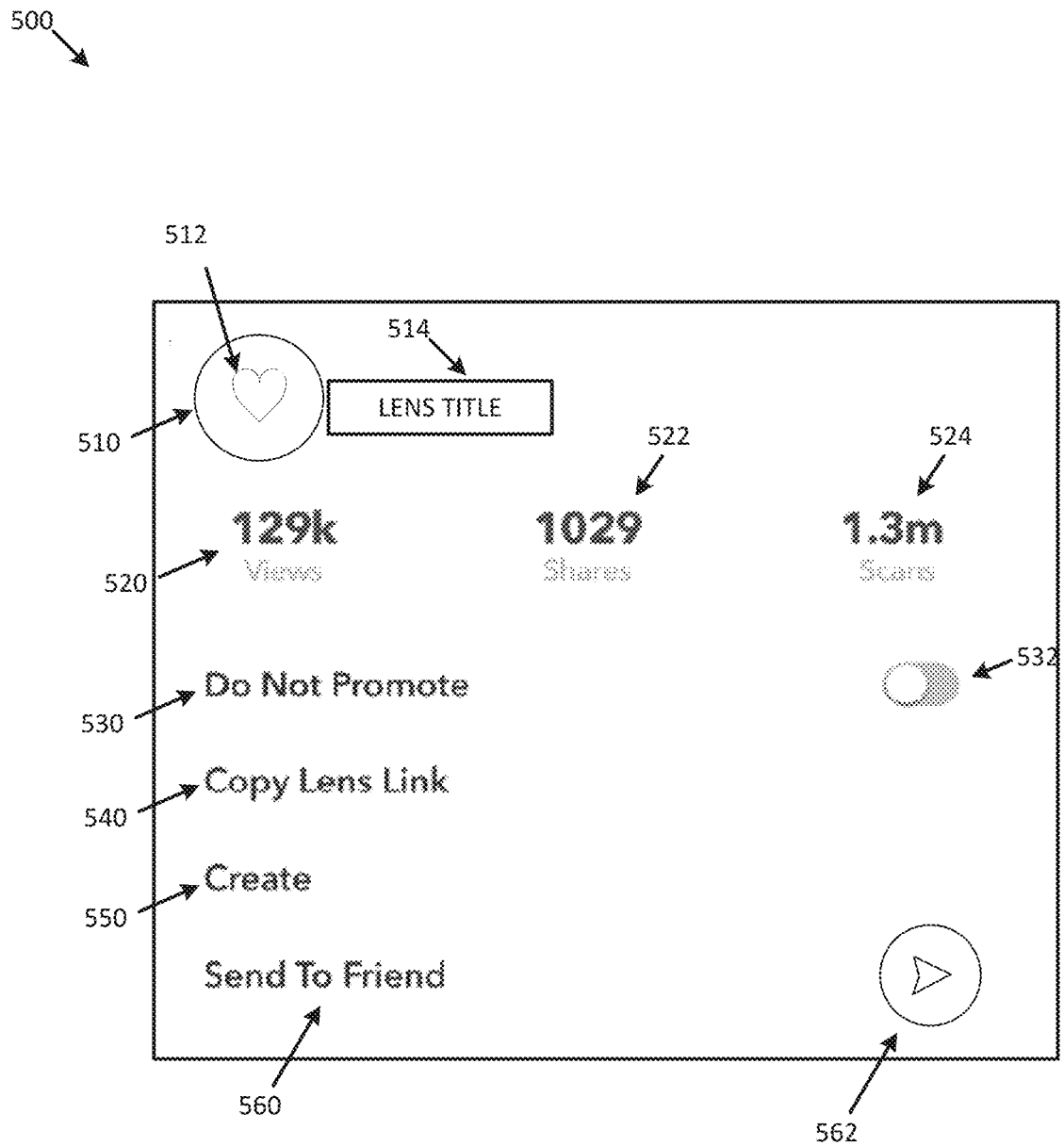
FIG. 5 is an interface diagram depicting aspects of a user interface, according to certain example embodiments.

FIG. 5 is an interface diagram depicting aspects of a user interface, according to certain example embodiments. FIG. 5 shows lens summary interface 500, which may be displayed on a screen of a device in response to selection of a lens tile 452 from within a creator user interface such as the illustrated user interface 405 of FIG. 4. FIG. 5 includes a lens icon 510 containing a representative illustration 512, a lens title 514, as well as additional lens detail information as described below in lens summary elements 520, 522, 524, 530, 540, and 550. In particular, lens element 520 details the number of times content using the lens associated with lens summary interface 500 has been viewed (e.g. displayed on a screen using an application managed by the messaging system 100), lens element 522 illustrates the number of times content associated with the lens has been shared (e.g. made available to accounts via message system communications), and element 524 illustrates the number of scans of the lens that have occurred in the system.

Element 530 is an interface element that enables the account associated with creation and/or management of the lens to control how the lens is made available within the messaging system 100. For example, control element 532 may adjust settings within the messaging system 100 to promote the lens via making the lens associated with interface 500 available in search results presented publicly to various users within the messaging system 100. In other embodiments, additional such controls may be part of interface 500, including limiting availability of the lens to friend accounts, to accounts that have paid a fee for access to the lens (e.g. the individual lens, groups of lenses, all lenses created and/or managed by an account associated with the lens, etc.), or other such system controls. Element 540 enables copying of a link to the lens data to enable communication of the lens data to different accounts and account devices. Element 550 provides a direct link to a camera interface to both unlock the lens associated with interface 500 for use within the camera, place the lens in a camera interface or content modification option (e.g. a carousel of lens options), and then directly enable capture of a piece of content and application of the lens to that content. As detailed above, providing such a link to a camera element of an application (e.g. application 104) reduces the interface operations to use a lens within a messaging system 100 as described herein. Element 560 enables direct communication of lens data to an account via selection of interface element 562 associated with communication of the lens data as part of element 560. Interface element 562, for example, may cause a list of accounts within the messaging system 100 to be displayed in order to directly communicate the lens data to the associated accounts and to make the lens available within the messaging system 100 for use by those accounts.

For accounts linked with a creator account, an interface similar to interface 405 is present, but instead of the lens tile 452 linking to lens summary interfaces 500 that enable management of the lens data and lens tile 452, a summary interface similar to interface 500 but without the management options is presented. This enables visiting of an associated account with the option to view lenses of other users in interfaces such as those described above. Selection of a lens tile 452 may provide limited information about the lens (e.g. the name and icon information) along with a create element 550 as described above linking to a camera to use the lens if the associated account is authorized to use the lens. In other embodiments, selecting the lens tile 452 when viewing a creator profile interface 405 for another account simply links to a camera interface with the lens unlocked and available if the associated account is authorized to use the lens.

In some embodiments, accounts that are not associated with a lens creator's account may view the lens creator's profile, particularly for publicity or popular accounts (e.g. accounts associated with businesses, brands, celebrities, etc.) Such an interface may include a different set of areas (e.g. no friend area), but may include stories shared by the creator account, content shared by the creator account, and lenses managed by the creator account. such an interface may include an area indicating "lenses by 'creator name'", for the situation where one account hosts or manages the lens of another creator account. In such a system, a host account may include multiple lens areas 450 for different accounts that have created lenses, and allow secondary management by the account associated with the profile that is being viewed. Such areas may be automatically sorted based on lens popularity, the popularity of a most popular lens for an individual creator of the lens (e.g. not the secondary host sharing and managing the lens), or in an order selected by the secondary host account which is displaying the lenses within the secondary host's profile interface. Such an interface may either include an unlock option when a lens tile 452 is selected, or may directly link to a camera as described above when the viewing account is authorized to use the associated lens.

In some embodiments, the first time an account visits the profile interface of another account where lens tiles 452 are present, a tutorial may be triggered automatically to provide use instructions associated with the lens tiles 452. Similarly, in some embodiments, a create account association interface is present to enable a viewing account to follow or request a bi-directional account link with the creator's account or a secondary host account within the messaging system 100. Such an interface may additionally allow removal of an association with any such account.

Figure 6:
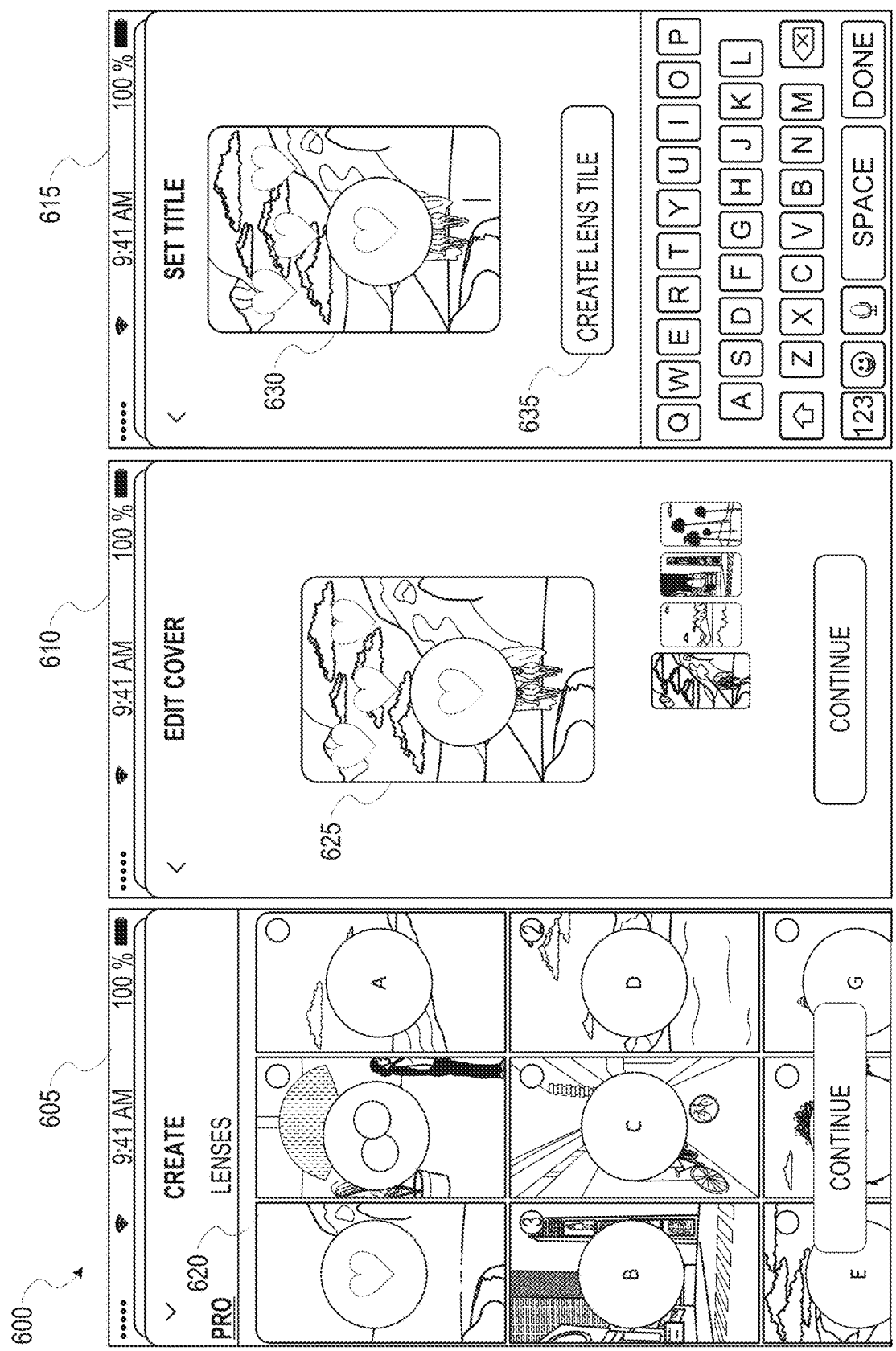
FIG. 6 is an interface diagram depicting aspects of graphical user interfaces according to certain example embodiments.

FIG. 6 is an interface diagram depicting aspects of a graphical user interface, according to certain example embodiments. FIG. 6 is a diagram 600 depicting graphical user interfaces (GUIs) 605, 610, and 615 to generate and/or manage lenses associated with lens tiles 620 within a messaging system 100, according to certain example embodiments.

As seen in FIG. 6, the GUI 605 comprises a display of a plurality of lens tiles 620. In some embodiments, the GUI 605 may be displayed at a creator account client device (e.g., client device 102). The plurality of lens tiles 620 and the associated lens data may either reside locally on the client device 102 or, in some embodiments, may comprise a shared media repository located within the database 120, and that may be accessible to user accounts authorized by the creator account.

In response to receiving a selection of a lens tile 620 from among the collection of lens tiles 620, the lens management system 124 may cause display of the GUI 610 to manage the lens tile (e.g. lens tile 625 from the plurality of lens tiles 620) for a specific lens to generate media content. For example, this may enable selection of a specific piece of content for use in illustrating the associated lens within lens tile 625, or changing such a piece of content. This may also enable selection of a lens title 625 or changing the lens icon 510 or the representative illustration 512 within the lens icon 510. In response to generating or updating the lens tile 625, the lens management system 124 may cause display of the GUI 615. Such an interface may further verify or allow addition of title text prior to the tile being propagated through the messaging system 100. In some embodiments, after the create lens tile element 635 is selected, the interface of FIG. 5 may be displayed for the lens to enable the creator account to select availability settings for the lens. For example, if the lens is not yet complete or is otherwise not intended for sharing, the lens and all associated information (e.g. the lens tile 625 and lens data) may be kept in a private setting. If the creator account wants to share the lens with a small group for feedback or other limitations, a semi-private setting may be used to allow sharing and use of the lens via a select set of system accounts. In other embodiments, the lens may be set for public use by any account within the messaging system 100. In still other embodiments, any of the above options may be set as a default to automatically occur in response to selection of create lens tile element 635, with user options to adjust availability settings later.

FIG. 7 is a flowchart illustrating a method for managing a collaborative user profile, according to certain example embodiments. FIG. 7 particularly describes a method 700 for managing lens data and presenting a creator profile interface to improve the operation of a device in a messaging system 100 that allows users to create and manage lenses. Method 700 may involve operations at a client device 102 in conjunction with operations of a messaging server system 108. In some embodiments, method 700 is embodied in computer-readable instructions stored in a non-transitory storage of a client device 102 that performs method 700 when the instructions are executed by processing circuitry of the client device 102.

Method 700 begins with optional creation of lens data associated with a first account within a messaging system 100. This may involve using tools within the messaging system 100 to generate the lens (e.g. a content transformation or other media overlays, filters, etc.) and associated lens data within the system, or uploading the data for the lens to the messaging system 100 from another source. In various embodiments, such operations also include the creation of a lens tile 625 and providing settings via a lens summary interface 500 or via other such management interfaces as described with respect to FIGS. 5 and 6 above.

The lens data for a plurality of lenses associated with the first account is then stored within a memory of a device (e.g. a client device 102 associated with an account of the messaging system 100) in operation 704. Such storage may be managed as part of a messaging application operating on the device as part of the messaging system 100.

Then, operation 706 involves displaying, on a display screen of the device, a lens creator profile interface comprising a plurality of lens tiles 620, and additionally being configured to display on the screen a lens summary interface 500 for each lens of the plurality of lens tiles 625 that can be reached directly from the plurality of lens tiles 620, where each lens tile 625 of the plurality of lens tiles 620 comprises a content image modified by a corresponding lens, and where the lens summary interface 500 for each lens comprises a set of lens detail information. This lens creator profile interface improves the operation of the device for lens creators by reducing the interface actions to view lens information, and by simplifying operations to manage and communicate lens data to other accounts within a messaging system 100. This is particularly true for an ephemeral messaging system, where content which may include a lens is constantly being removed from the system by deletion triggers which provide privacy and security for system users, and changes in relevant data and metrics occurs frequently and is difficult to track. Optional operation 708 then involves communicating lens data between accounts using the lens creator profile interface. In various other embodiments, interfaces connected with the creator profile interface, such as a lens summary interface 500, may be used instead for such communication or lens management. In either case, the direct connections and structures for managing lens data reduce the interface operations for such communications and lens settings.

In various other embodiments of specific implementations of method 700 above, other variations may be used. In some example embodiments, a corresponding lens for each lens tile 625 comprises image transformation data in some embodiments configured to modify or overlay video or image data communicated via an ephemeral messaging system, where access to the corresponding lens is limited by the ephemeral messaging system and an ephemeral messaging application operating on the computing device, where the ephemeral messaging application comprises the lens creator profile interface.

In some such embodiments, the lens creator profile interface further comprises a content collection interface area 430, a friend account interface area, an image icon area, and a lens interface area 450, where the plurality of lens tiles 620 are positioned within the lens interface area 450. In some embodiments, each lens tile 625 of the plurality of lens 620 tiles further comprises a lens icon 510, a lens name 459, and lens view data, and, in further embodiments, the placement of the lens interface area 450 is automatically adjusted based on the lens view data.

The corresponding lens for each lens tile 625 is identified within some embodiments of the ephemeral messaging system as created in association with a first account, and where the first account is associated with the lens creator profile interface. In some embodiments, the lens interface area 450 is positioned above the image icon area when the lens view data for at least a first lens comprises a lens view indicator above a first threshold value, and where the lens interface area 450 is positioned below the image icon area when the lens view data for the corresponding lens of each lens tile 625 is less than or equal to the first threshold value.

In some embodiments, the content collection interface comprises a first content collection comprising a plurality of images from a plurality of different accounts of the ephemeral messaging system, where each piece of content of the first content collection comprises content modified by a first lens associated with a first tile of the plurality of lens tiles 620. Additional such embodiments may operate where the content collection interface comprises a plurality of content collections comprising a corresponding plurality of images from a corresponding plurality of different accounts of the ephemeral messaging system, where each piece of content of the plurality of content collection comprises content modified by a corresponding content collection lens from lenses associated with the plurality of lens tiles 620.

The lens summary interface 500 comprises a list of accounts associated with the corresponding lens in some systems, where a total number of views associated with the corresponding lens, a number of shares associated with the corresponding lens, and a number of scans associated with the corresponding lens. In some such systems, the lens summary interface 500 further comprises a set of publication settings associated with availability of the corresponding lens via the ephemeral messaging system. Similarly, in some systems, the set of publication settings comprises a do not promote setting. In some embodiments, the lens summary interface 500 comprises a lens share sheet comprising an interface for sharing the corresponding lens with one or more accounts of the ephemeral messaging system.

In some embodiments, the lens creator profile interface is accessible via a friend listing interface for a second account associated with a first account that controls the lens creator profile interface of the first account.

The lens creator profile interface is accessible via a lens purchase history interface for a second account associated with a first account that controls the lens creator profile interface of the first account in some embodiments, where the second account has purchased at least a first lens of lenses associated with the plurality of lens tiles 620.

Software Architecture

Figure 8:
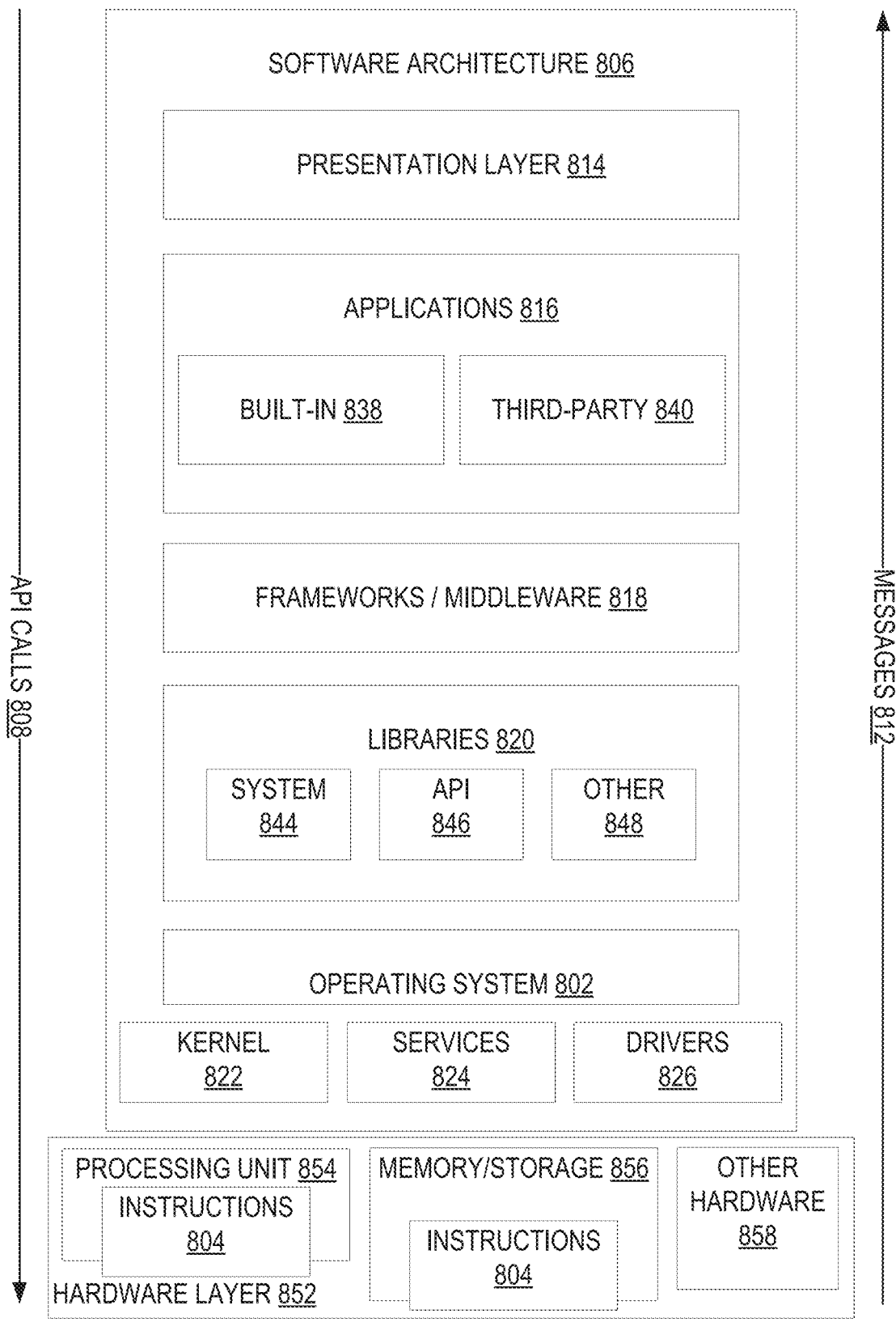
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as the machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
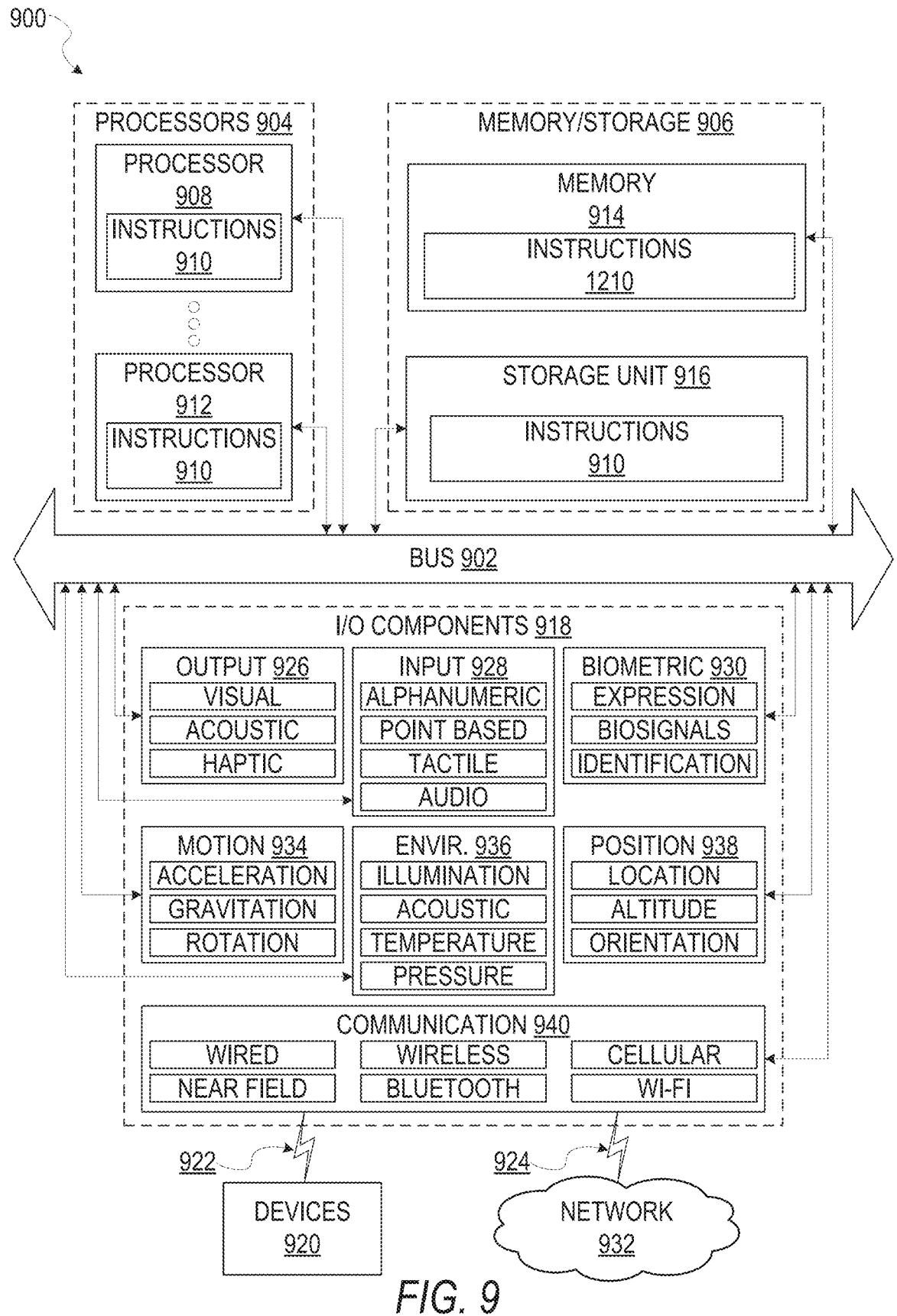
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and i/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922 respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL", in this context refers, to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE", in this context, refers to any machine 900 that interfaces to a communications network 932 to obtain resources from one or more server systems or other client devices 102. A client device 102 may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network 932.

"COMMUNICATIONS NETWORK", in this context, refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network may include a wireless or cellular network and the coupling 924 may be a Code Division Multiple Access (CDMA) connection, a Global System for Mobile communications (GSM) connection, or other type of cellular or wireless coupling. In this example, the coupling 924 may implement any of a variety of types of data transfer technology, such as Single Carrier Radio Transmission Technology (xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE", in this context, refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM", in this context, refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database 120, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT", in this context, refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor 908. Once configured by such software, hardware components become specific machines (or specific components of a machine) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an application program interface (API)). The performance of certain of the operations may be distributed among the processors 904, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR", in this context, refers to any circuit or virtual circuit (a physical circuit emulated by logic executing on an actual processor 908) that manipulates data values according to control signals (e.g., "commands", "op codes", "machine code", etc.) and which produces corresponding output signals that are applied to operate a machine 900. A processor 908 may, for example, be a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC) or any combination thereof. A processor 908 may further be a multi-core processor having two or more independent processors (sometimes referred to as "cores") that may execute instructions contemporaneously.

"TIMESTAMP", in this context, refers to a sequence of characters or encoded information identifying when a certain event occurred, for example giving date and time of day, sometimes accurate to a small fraction of a second.

What is claimed is:

1. A computing device comprising:
a display screen;
one or more processors; and
memory having instructions stored thereon that, when executed by the one or more processors, causes the computing device to perform operations comprising:
causing the display screen to display a lens creator profile interface that is accessible from within an ephemeral messaging system account of a creator of a plurality of lenses, the lens creator profile interface:
comprising the plurality of lens tiles, each lens tile of the plurality of lens tiles corresponding to a respective lens of the plurality of lenses created by the creator,
comprising a content collection interface area, and
comprising a friend account interface area including one or more additional tiles, individual tiles of the one or more additional tiles corresponding to an account of an additional user of the ephemeral messaging system having a social graph connection with the creator and being selectable to enable messaging between the creator and the additional user within the ephemeral messaging system and selectable to control access by the additional user to one or more lenses created by the creator; and
additionally being configured to display a lens summary interface for each lens related to the plurality of lens tiles, each lens summary interface being directly accessible from a respective lens tile of the plurality of lens tiles,
wherein each lens tile of the plurality of lens tiles comprises a content image modified by a corresponding lens, and wherein the lens summary interface for each lens comprises a set of lens detail information, and
wherein the content collection interface area includes a plurality of content collection tiles, each content collection tile corresponding to an individual content collection that comprises content from a plurality of different accounts of the ephemeral messaging system that has been modified according to a lens that corresponds to a lens tile of the plurality of lens tiles.

2. The computing device of claim 1, wherein the corresponding lens for each lens tile comprises image transformation data configured to modify or overlay video or image data communicated via the ephemeral messaging system, wherein access to the corresponding lens is limited by the ephemeral messaging system and an ephemeral messaging application operating on the computing device, wherein the ephemeral messaging application comprises the lens creator profile interface.

3. The computing device of claim 1, wherein the lens creator profile interface further comprises a user identification area and a lens interface area, wherein the plurality of lens tiles are positioned within the lens interface area.

4. The computing device of claim 3, wherein each lens tile of the plurality of lens tiles further comprises a lens icon, a lens name, and lens view data.

5. The computing device of claim 4, wherein a placement of the lens interface area with respect to the friend account interface area is based on a first priority score of the lens interface area in relation to a second priority score of the friend account interface area.

6. The computing device of claim 4, wherein placement of the user identification area and the content collection interface area within the lens creator profile interface is fixed and placement of the lens interface area and the friend account interface area is adjustable.

7. The computing device of claim 1, wherein:
the lens creator profile interface further comprises an image icon area and a lens interface area, the plurality of lens tiles being positioned within the lens interface area;
each lens tile of the plurality of lens tiles further comprises a lens icon, a lens name, and lens view data;
placement of the lens interface area is automatically adjusted based on the lens view data;
the lens interface area is positioned above the image icon area when the lens view data for at least a first lens comprises a lens view indicator above a first threshold value; and
the lens interface area is positioned below the image icon area when the lens view data for the corresponding lens of each lens tile is less than or equal to the first threshold value.

8. The computing device of claim 1, wherein the content collection interface comprises a first content collection comprising a plurality of images from a number of accounts of the ephemeral messaging system, wherein each piece of content of the first content collection comprises content modified by a first lens associated with a first tile of the plurality of lens tiles.

9. The computing device of claim 1, wherein the operations further comprise:
causing the display screen to display a content collection tile in the content collection interface area based on determining that a content collection corresponding to the content collection tile includes at least a threshold number of public pieces of content modified using a lens associated with a lens tile of the plurality of lens tiles.

10. The computing device of claim 1, wherein the lens summary interface comprises a list of accounts associated with the corresponding lens, a total number of views associated with the corresponding lens, a number of shares associated with the corresponding lens, and a number of scans associated with the corresponding lens.

11. The computing device of claim 1, wherein the lens summary interface further comprises a set of publication settings associated with availability of the corresponding lens via the ephemeral messaging system.

12. The computing device of claim 11, wherein the set of publication settings comprises a do not promote setting.

13. The computing device of claim 1, wherein the lens summary interface comprises a lens share sheet comprising an interface for sharing the corresponding lens with one or more accounts of the ephemeral messaging system.

14. The computing device of claim 1, wherein the lens creator profile interface is accessible via a friend listing interface for an additional ephemeral messaging system account that is associated with the ephemeral messaging system account of the creator of the plurality of lenses.

15. The computing device of claim 1, wherein the lens creator profile interface is accessible via a lens purchase history interface for an additional ephemeral messaging system account associated with the ephemeral messaging system account of the creator of the plurality of lenses, wherein the additional ephemeral messaging system account has purchased at least a first lens of the plurality of lenses.

16. A method comprising:
storing, in a memory of a computing device, application data for an application associated with an ephemeral messaging system and lens data for a plurality of lenses having a creation association with a first account of a creator of the plurality of lenses within the ephemeral messaging system; and causing to be displayed, on a display screen of the computing device, a lens creator profile interface that is accessible from within the first account, the lens creator profile interface comprising:

a plurality of lens tiles, each lens tile of the plurality of lens tiles corresponding to a respective lens of the plurality of lenses that is created by the creator of the plurality of lenses, a content collection interface area, a lens summary interface for each lens related to the plurality of lens tiles, each lens summary interface being directly accessible from a respective lens tile of the plurality of lens tiles, and a friend account interface area including one or more additional tiles, individual tiles of the one or more additional tiles corresponding to an account of an additional user of the ephemeral messaging system having a social graph connection with the creator and being selectable to enable messaging between the creator and the additional user within the ephemeral messaging system and selectable to control access by the additional user to one or more lenses created by the creator, wherein each lens tile of the plurality of lens tiles comprises a content image modified by a corresponding lens, and wherein the lens summary interface for each lens comprises a set of lens detail information, and wherein the content collection interface area includes a plurality of content collection tiles, each content collection tile corresponding to an individual content collection that comprises content from a plurality of different accounts of the ephemeral messaging system that has been modified according to a lens that corresponds to a lens tile of the plurality of lens tiles.

17. The method of claim 16, wherein the lens creator profile interface is accessible via a lens purchase history interface for a second account associated with the first account that controls the lens creator profile interface, wherein the second account has purchased at least a first lens of lenses associated with the plurality of lens tiles; and wherein the lens creator profile interface is accessible via a friend listing interface for a third account associated with the first account.

18. A non-transitory computer readable medium comprising instructions that, when executed by one or more processors of a computing device, cause the device to perform operations comprising: storing, in a memory of the computing device, application data for an application associated with an ephemeral messaging system and lens data for a plurality of lenses created by a first account of a creator of the plurality of lenses associated with the ephemeral messaging system; and causing to be displayed, on a display screen of the computing device, a lens creator profile interface that is accessible from within the first account, the lens creator profile interface comprising: a plurality of lens tiles, each lens tile of the plurality of lens tiles corresponding to a respective lens of the plurality of lenses that is created by the creator of the plurality of lenses, a content collection interface area, a lens summary interface for each lens related to the plurality of lens tiles, each lens summary interface being directly accessible from a respective lens tile of the plurality of lens tiles, and a friend account interface area including one or more additional tiles, individual tiles of the one or more additional tiles corresponding to an account of an additional user of the ephemeral messaging system having a social graph connection with the creator and being selectable to enable messaging between the creator and the additional user within the ephemeral messaging system and selectable to control access by the additional user to one or more lenses created by the creator, wherein each lens tile of the plurality of lens tiles comprises a content image modified by a corresponding lens, and wherein the lens summary interface for each lens comprises a set of lens detail information, and wherein the content collection interface area includes a plurality of content collection tiles, each content collection tile corresponding to an individual content collection that comprises content from a plurality of different accounts of the ephemeral messaging system that has been modified according to a lens that corresponds to a lens tile of the plurality of lens tiles.

19. The non-transitory computer readable medium of claim 18, wherein the lens summary interface comprises a list of accounts associated with the corresponding lens, a total number of views associated with the corresponding lens, a number of shares associated with the corresponding lens, and a number of scans associated with the corresponding lens; and wherein the lens summary interface further comprises a set of publication settings associated with availability of the corresponding lens via the ephemeral messaging system.

20. The non-transitory computer readable medium of claim 18, wherein the lens summary interface comprises a lens share sheet comprising an interface for sharing the corresponding lens with one or more accounts of the ephemeral messaging system;

wherein the interface for sharing the corresponding lens comprises at least a chat share element, a messaging share element, and a scan share element.

* * * * *